(12) United States Patent
Pietilainen et al.

(10) Patent No.: US 7,716,738 B2
(45) Date of Patent: May 11, 2010

(54) METHOD AND SYSTEM IN A COMMUNICATION NETWORK FOR ALLOCATING AND CHANGING LINK-LEVEL ADDRESSES

(75) Inventors: Antti Pietilainen, Espoo (FI); Olli-Pekka Pohjola, Hetsinki (FI)

(73) Assignee: Nokia Siemens Networks OY, Espoo (FI)

( * ) Notice: Subject to any disclaimer, the term of this patent is extended or adjusted under 35 U.S.C. 154(b) by 1198 days.

(21) Appl. No.: 10/511,825

(22) PCT Filed: May 3, 2002

(86) PCT No.: PCT/IB02/02825

§ 371 (c)(1),
(2), (4) Date: Oct. 20, 2004

(87) PCT Pub. No.: WO03/094424

PCT Pub. Date: Nov. 13, 2003

(65) Prior Publication Data

US 2005/0166267 A1    Jul. 28, 2005

(51) Int. Cl.
*G08B 23/00* (2006.01)
(52) U.S. Cl. ....................................................... 726/23
(58) Field of Classification Search ................ 370/910, 370/431; 726/12, 23
See application file for complete search history.

(56) References Cited

U.S. PATENT DOCUMENTS

| 5,276,813 | A | * | 1/1994 | Elliott et al. ................... 710/9 |
|---|---|---|---|---|
| 5,872,783 | A |   | 2/1999 | Chin |
| 6,009,103 | A | * | 12/1999 | Woundy ...................... 370/401 |
| 6,026,165 | A | * | 2/2000 | Marino et al. ................ 380/273 |
| 6,028,933 | A | * | 2/2000 | Heer et al. ................... 713/169 |
| 6,097,732 | A | * | 8/2000 | Jung ........................... 370/466 |
| 6,101,499 | A | * | 8/2000 | Ford et al. ...................... 707/10 |
| 6,591,306 | B1 | * | 7/2003 | Redlich ....................... 709/245 |
| 6,886,102 | B1 | * | 4/2005 | Lyle .............................. 726/23 |
| 2002/0133607 | A1 | * | 9/2002 | Nikander ..................... 709/229 |
| 2002/0188713 | A1 | * | 12/2002 | Bloch et al. .................. 709/223 |
| 2003/0018804 | A1 | * | 1/2003 | Laxman et al. .............. 709/236 |

FOREIGN PATENT DOCUMENTS

| EP | 0 472 836 A1 |   | 3/1992 |
| GB | 2 344 978 A |   | 6/2000 |
| GB | 2 367 986 A |   | 4/2002 |
| GB | 2367986 | * | 4/2002 |

OTHER PUBLICATIONS

Ross, M, "Military/government digital switching systems" May 1983, vol. 21, Issue: 3, pp. 18-25.*

* cited by examiner

*Primary Examiner*—Eleni A Shiferaw
(74) *Attorney, Agent, or Firm*—Squire, Sanders & Dempsey L.L.P.

(57) ABSTRACT

A method and communication system, are discussed, including a plurality of communication nodes connected by a data link, and a communication controller configured to allocate link-level addresses to the communication nodes. The communication nodes may be identified for communications over the data link. The communication controller is further configured to change from time to time the link-level addresses allocated to each communication node and to transmit the newly allocated link-level address to a respective communication node in an encrypted form.

17 Claims, 1 Drawing Sheet

Figure 1:
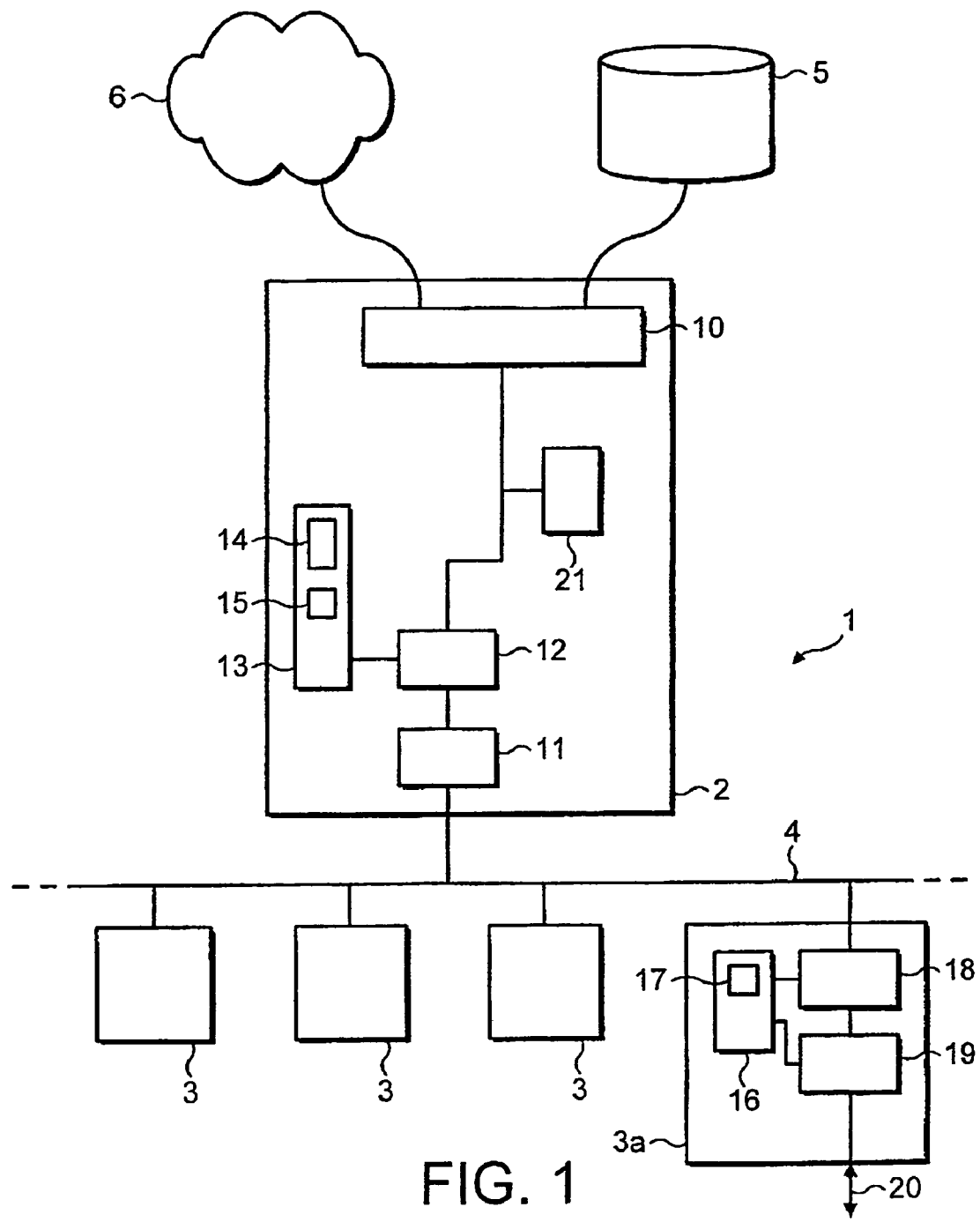

METHOD AND SYSTEM IN A COMMUNICATION NETWORK FOR ALLOCATING AND CHANGING LINK-LEVEL ADDRESSES

This invention relates to changing the addresses of entities in a communication network.

When data is being transferred over a communication network it is often important to protect the data from being accessed by an unauthorised person. Often the data is encrypted to prevent it from being read by someone who does not have a key to decrypt it. This kind of hostile hacking of other user's data may also be called sniffing or eavesdropping. But in addition to the data itself there is other ancillary information that may be of use to an unauthorised person who has access to the network. This could include information on the type, timing or amount of traffic being sent to particular entities in the network: it may give clues that could assist a hacker to breach the network's security, or in a commercial network it could reveal sensitive commercial information about the level to which the network is being utilised.

The problems of protecting against access to data and ancillary information are especially acute in shared media networks. In a shared media network a number of entities are connected to each other by a common data link, and data intended for one or more of the entities is broadcast over the link. If it is intended that only one of the entities should receive certain data then a broadcast and select scheme can be used. To implement this scheme each entity has a link-level address in the network and the data is transmitted in conjunction with the link-level address of the entity for which it is intended. When an entity recognises that its link-level address is transmitted in conjunction with an amount of data it decodes that data.

U.S. Pat. No. 6,028,933 describes a method for encrypting data over a shared media multiple access network. This document suggests improving security by full encryption of all downstream bits.

Shared media networks offer a cost-effective way of implementing a network for providing a number of nodes with access to a resource such as the internet. In such a situation the network can comprise a single high-speed transceiver in an access node or hub, which is capable of communicating with many nodes at consumers' premises. A single shared high-speed bus connects the hub to the consumer nodes (also known as satellite nodes). The satellite nodes need a high-speed interface to receive information over the link, but the rest of the electronics at the satellite nodes can be slower and therefore relatively inexpensive. The network can take any suitable topology, for example star, tree, ring, loop or linear. Since all nodes are connected to the same high-speed bus they can listen to traffic that is not intended for them. Even if the data is encrypted, a listening node could detect ancillary information that could be valuable: for instance it could identify how much data is addressed to each other entity and when it is sent. In addition, if the listener wanted to read communications to a particular node he could intercept transmissions that are addressed to that node and store them for decrypting later using a powerful computer.

Wireless shared media networks are especially at risk from this form of monitoring since it is difficult to prevent physical access to the data channel. For example, in IEEE802.11b wireless LAN networks any compatible receiver within range of the hub can listen to transmissions intended for other entities in the network.

One solution to these problems is for consumers or network operators who are concerned about privacy to use a dedicated link between the hub and each node. However, this is expensive.

There is therefore a need to improve the security of networks by making it more difficult for a listener to access ancillary data on network usage.

According to one aspect of the present invention there is provided a communication system comprising: a plurality of communication nodes connected by a data link; a communication controller for allocating link-level addresses to the communication nodes whereby the nodes may be identified for communications over the link; the communication controller being arranged to change from time to time the addresses allocated to each communication node and transmit the newly allocated address to the respective node in encrypted form.

Most preferably the communication controller is arranged to change the addresses from time to time during a period whilst communication with the nodes is taking place over the data link. Such communication may be discontinuous, and is most preferably packet-based communication. Such communication may suitably be traffic data communication between the communication controller and the or each node.

The data link is preferably a shared data link. The shared data link is shared between the nodes so that any node connected to the data link has access to communications over the link. Suitably each node is arranged to interpret only the communications over the node that are addressed to it. The data link may take any suitable topology. The data link may, for example, be a cable link or a wireless link.

Further aspects of the invention are set out in the dependent claims.

The present invention will now be described by way of example with reference to the accompanying drawings.

In the drawing:

FIG. 1 is a schematic diagram of a data transmission system, showing components of a hub and a terminal in detail.

In the data transmission system of FIG. 1 there is a network in which procedures are implemented to inhibit access by a listener to ancillary data on network usage. Receiving devices in the network are allocated link-level addresses for use in the network, and the link-level addresses are changed from time to time so that it is problematic for a listener to determine which entities have which addresses. This means that it is difficult for the listener to derive ancillary information on usage of the network. Additional procedures, which are described in more detail below, are also used to supplement the security of this procedure.

In FIG. 1 there is a network shown generally at 1, which comprises a hub 2 and a set of satellite nodes 3. One of the satellite nodes: 3a, is shown in more detail than the others. The satellite nodes are connected to the hub by a shared high-speed data bus 4. The hub 2 is connected to further data resources, for example a local data store 5 and the Internet 6.

In practice the satellite nodes could, for example, be personal computers or set-top boxes arranged to receive data from the data bus. The data bus could be an optical fibre link installed to consumers' premises. Instead of a data bus, the shared media may comprise a wireless interface such as radio or optical interface, for instance.

In FIG. 1 components of the hub 2 and one of the nodes 3a are shown in more detail. The hub comprises an interface 10 by which it is connected to the upstream data resources 5, 6; and an interface 11 by which it is connected to the data bus 4. Interface 10 could be an Ethernet switch or IP router. Interface 11 could be an optical transceiver. Data passing between interfaces 10 and 11 passes through a converter 12, which operates under the control of a link controller 13. The link controller has a store 14 in which it maintains a register of the information needed for communication in the network with each of the nodes 3. That comprises a list of, for each of the nodes 3: the link-level address in the network 1 that is assigned to that node, and the encryption/decryption key(s) assigned to that node. Other information may also be stored to support additional security protocols, for instance the MAC address of the respective node.

The hub 2 may perform address translation so that the nodes 3 are represented to the upstream resources by the address of the hub.

When data from interface 10 is to be sent to one of the satellite nodes it is passed to the converter 12 which operates under the control of the link controller 13 to form a message for transmission over link 4. The link controller provides the converter with the link-level address of the destination node and the encryption key for transmissions to that node. The converter encrypts the data using the encryption key and forms the message so as to be addressed to the node's address. The message is then passed to interface 11.

When data from interface 11 is to be sent to an upstream resource it is passed to the converter 12 which operates under the control of the link controller 13 to form a message for upstream transmission. The converter informs the link controller of the link-level address from which the data was sent. The link controller retrieves from store 14 the appropriate decryption key and provides it to the converter. The converter then decrypts the data using the decryption key and passes the data to interface 11.

At each satellite node 3 there is a transceiver controller 16. The transceiver controller 16 includes a store 17 which stores the link-level address and the encryption/decryption key(s) allocated to the node. The transceiver controller is connected to a data selector 18 and an encryption/decryption unit 19. The data selector 18 is informed by the transceiver controller 16 of the address allocated to the node. The data selector monitors data on link 4 for messages addressed to that node. Any such messages are passed to the encryption/decryption unit 19. It decrypts the messages using the decryption key provided to it by the transceiver controller 16 and then passes the data on for local use (see link 20). When data is received over link 20 for transmission over link 4 the data passes to encryption/decryption unit 19, which encrypts the data using the node's encryption key (as provided by transceiver controller 16) and then passes it to hub 2 via link 4.

Hub 2 also includes a link security controller 15. The link security controller adapts the operation of the network over data bus 4.

The link security controller controls the allocation of link-level addresses to the nodes 3. The link security controller has a pool of addresses available to it and stores a record of which of those have been allocated to nodes 3. When a new node connects to the network it is allocated one of the unallocated addresses from the pool. Additionally, from time to time the link security controller changes the addresses allocated to the nodes. It does this by selecting another unallocated address from the pool, passing it to the node whose address is to be changed and then storing that address as being allocated and the address previously allocated to that node as being unallocated. When an address is allocated to a node it stores it in store 17 and then uses it as described above.

When the link security controller 15 allocates an address to a node it transmits that address to the node in encrypted form, by means of the previously established encryption system using units 11 and 18. Thus nodes listening on link 4 cannot determine the new address allocated to the node. This may be impossible when the node is first allocated an address since at that stage encryption may not have been established for that node. In that situation the security controller allocates the node's initial address in plain transmission and then, once encryption has been established, allocates another address over the encrypted channel.

The link security controller determines when to change the addresses allocated to nodes. It may do so randomly or pseudo randomly, or periodically. It is preferred that it changes the nodes' addresses one by one at random intervals. The time between address changes can conveniently be selected to balance the increased security that derives from the address change with the additional traffic and processing involved in an address change. This will depend on the network conditions.

The link security controller selects new addresses randomly or pseudo randomly from the pool of addresses.

As a result of these features, someone listening on the link 4 cannot easily keep track of which address is allocated to which node. Therefore, he cannot monitor what volume of traffic is passing to which node.

When an address is changed the store 14 is updated. There are two options. If the node whose address is changed is to keep the same encryption key as it had before then the list in store 14 is updated to associate that node's new address with its previous key or key pair. Alternatively, the node's encryption key may be changed at the same time as its address is changed. In that case the record stored in store 14 for the previous address is deleted and a new record is added to associate the new address with the new key or key pair.

To provide additional security, the hub 2 may be arranged to transmit data to the nodes in a random or pseudo random order. The data is sent to the nodes in discrete units, such as frames or packets. When such data is to be transmitted to the nodes the order in which the units are sent is determined at random (or pseudo randomly) by the hub 2. Then the order in which the nodes are addressed is substantially unpredictable to a listener on the link. This provides additional security.

The network has a further security feature. Traffic generator 17 is capable of generating spurious traffic that can be carried over link 4. It does this during times when the link would otherwise be idle. The spurious traffic could have any content, but it is conveniently random or pseudo random. The spurious traffic is formed into addressed messages, as for other traffic over the link, but is addressed to addresses that are unallocated, so that it is not picked up by any of the nodes. The result of this is that a listener on the link cannot tell how much traffic there is on the link, because the link appears to be fully or almost fully utilised all the time.

The systems described above are most conveniently implemented in packet-switched networks, although they could also be used in networks of other types.

One suitable platform for implementing the systems described above is the Ethernet Passive Optical Network (EPON) currently being standardised in the IEEE802.3ah Ethernet First Mile (EFM) task force.

Ethernet PON is a point-to-multipoint network used to send Ethernet frames. It is planned to use the broadcast and select method for downstream traffic and a time division multiple access method for upstream traffic. There will be a PHY ID address which will be used in broadcasting Ethernet frames to destination nodes and whereby the destination nodes can select the frames they should decode. The PHY ID will be included at the beginning of an Ethernet frame. The structure of the Ethernet frame will then be:

PHY ID
MAC ADDRESS
—FIELDS—
—DATA—
—OTHER FIELDS—

All information except the PHY ID is to be encrypted. The PHY ID is an identifier that identifies which node is to receive the frame. The PHY ID thus also indicates which encryption and decryption keys are to be used for the frame.

In a system of this type the process for changing the PHY ID to implement the address changing function of the security controller 15 as described above is:

1. A "New PHY ID" command is sent to the destination node whose address is to be changed. The command is sent in a frame that is addressed using the node's current (old) PHY ID and is encrypted using the encryption key appropriate to that node. The command includes, in the encrypted part of the frame, the new PHY ID for the node. This new PHY ID is linked to the existing encryption key, although the key could also be changed at the same time (in the same command as instructs the node to change address), to further increase security.

2. At the destination node the command is identified as being addressed to it, and is decrypted and interpreted. The destination node then adopts the new PHY ID and, if present, the new encryption key.

The present invention is preferably implemented over a shared data link, since in that situation it can provide additional advantages, but it could be implemented over links of other types. The data link could be any suitable form of data channel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system, comprising:
a hub comprising a transceiver;
a plurality of communication nodes connected by a data link to the transceiver by a common bus or a wireless broadcast channel, the data link being a shared data link whereby any node connected to the data link has access to communications broadcast over the common bus or wireless broadcast channel; and
a communication controller configured to allocate link-level addresses to the communication nodes,
wherein the communication nodes may be identified for communications over the common bus or wireless broadcast channel,
wherein the communication controller is further configured to change from time to time the link-level addresses allocated to all of the plurality of communication nodes connected to the common bus or wireless broadcast channel and to transmit the newly allocated link-level addresses to respective communication nodes in an encrypted form over the common bus or wireless broadcast channel,
wherein the system comprises a data distribution unit connected between the data link and at least one external data source, and wherein the data distribution unit is configured to forward data from the data source to the communication nodes via the data link,
wherein the data distribution unit is further configured to forward the data to the plurality of communication nodes in a random or pseudo-random order over the common bus or wireless broadcast channel;
wherein the data link is an Ethernet link, and
wherein the link-level addresses are Ethernet PHY ID addresses.

2. The system as claimed in claim 1, wherein communications over the data link comprise an address part, indicating the address of the one of the communication nodes to which the respective communication is directed, and a payload part.

3. The system as claimed in claim 2, wherein the address part is not encrypted.

4. The system as claimed in claim 2, wherein the payload part is encrypted.

5. The system as claimed in claim 1, wherein communications over the data link are in the form of data packets.

6. The system as claimed in claim 1, wherein the data distribution unit is configured to, when it would otherwise not be transmitting data to the communication nodes, transmit over the data link communications addressed to a link-level address that is not allocated to any of the communication nodes.

7. The system as claimed in claim 1, wherein a communication node is configured to store a link-level address allocated to it and to ignore communications on the data link addressed to link-level addresses other than that link-level address.

8. An apparatus, comprising:
a controller configured to
allocate link-level addresses to a plurality of communication nodes connected by a data link to a transceiver of a hub by a common bus or a wireless broadcast channel, wherein the communication nodes may be identified for communications over the data link, the data link being a shared data link whereby any node connected to the data link has access to communications broadcast over the common bus or wireless broadcast channel,
change from time to time the link-level addresses allocated to all of the plurality of communication nodes, connected to the common bus or wireless broadcast channel,
transmit the newly allocated link-level addresses to respective communication nodes in an encrypted form, and
forward data the plurality of communication nodes in a random or pseudo-random order over the common bus or wireless broadcast channel;
wherein the data link is an Ethernet link, and
wherein the link-level addresses are Ethernet PHY ID addresses.

9. The apparatus as claimed in claim 8, wherein the controller is further configured to transmit the newly allocated link-level addresses to the respective node in a communication comprising an address part configured to indicate a current address of the respective node and a payload part comprising the newly allocated addresses in encrypted form.

10. The apparatus as claimed in claim 8, wherein the controller is further configured to:
allocate encryption keys to each of the plurality of communication nodes;

change from time to time the encryption key allocated to each of the plurality of communication nodes; and transmit the newly allocated encryption key to the respective node in encrypted form.

11. The apparatus as claimed in claim 10, wherein the controller is further configured to transmit the newly allocated encryption key to the respective node in the payload part that contains a newly allocated address for the respective node.

12. The apparatus as claimed in claim 8, wherein the controller is further configured to change the link-level addresses allocated to each of the plurality of communication nodes at one of random, pseudo-random, or periodic intervals.

13. A method, comprising:

allocating link-level addresses to a plurality of communication nodes connected by a data link to a transceiver of a hub by a common bus or a wireless broadcast channel, wherein the communication nodes may be identified for communications over the data link, the data link being a shared data link whereby any node connected to the data link has access to communications broadcast over the common bus or wireless broadcast channel;

changing from time to time the link-level addresses allocated to all of the plurality of communication nodes;

transmitting the newly allocated link-level addresses to a respective communication node in an encrypted form; and forwarding data to the plurality of communication nodes in a random or pseudo-random order over the common bus or wireless broadcast channel;

wherein the data link is an Ethernet link, and wherein the link-level addresses are Ethernet PHY ID addresses.

14. The method as claimed in claim 13, wherein the transmitting comprises transmitting the newly allocated link-level addresses to the respective node in a communication comprising an address part configured to indicate a current address of the respective node and a payload part comprising the newly allocated addresses in encrypted form.

15. The method as claimed in claim 13, further comprising:

allocating encryption keys to each of the plurality of communication nodes;

changing from time to time the encryption key allocated to each of the plurality of communication nodes; and transmitting the newly allocated encryption key to the respective node in encrypted form.

16. The method as claimed in claim 15, wherein the transmitting further comprises transmitting the newly allocated encryption key to the respective node in the payload part that contains a newly allocated address for the respective node.

17. The method as claimed in claim 13, wherein the changing comprises changing the link-level addresses allocated to each of the plurality of communication nodes at one of random, pseudo-random, or periodic intervals.

* * * * *